Figure 1:
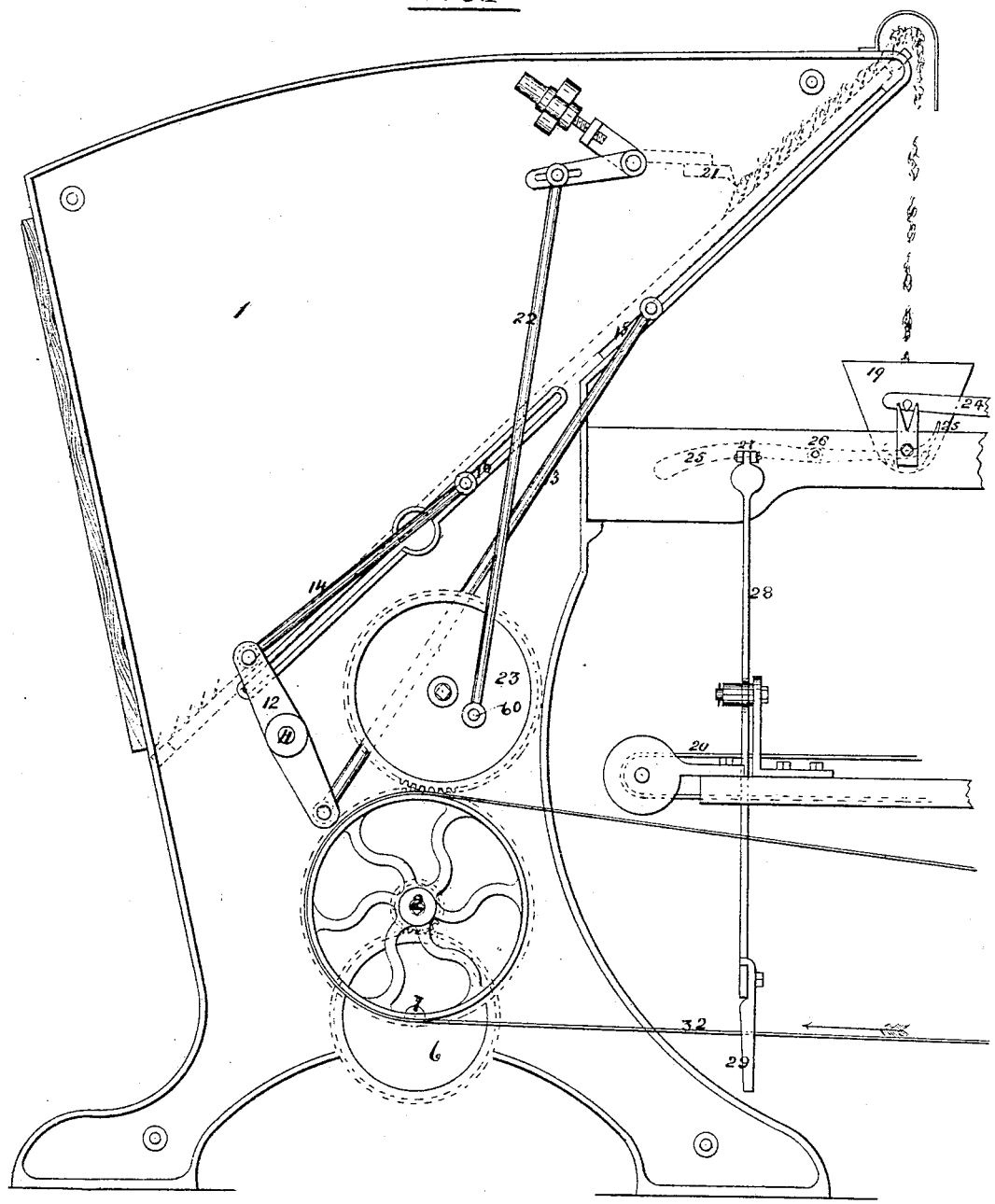

(No Model.) 4 Sheets—Sheet 1.

T. E. AINLEY.
MECHANISM FOR FEEDING CARDING MACHINES.

No. 288,686. Patented Nov. 20, 1883.

WITNESSES. INVENTOR.

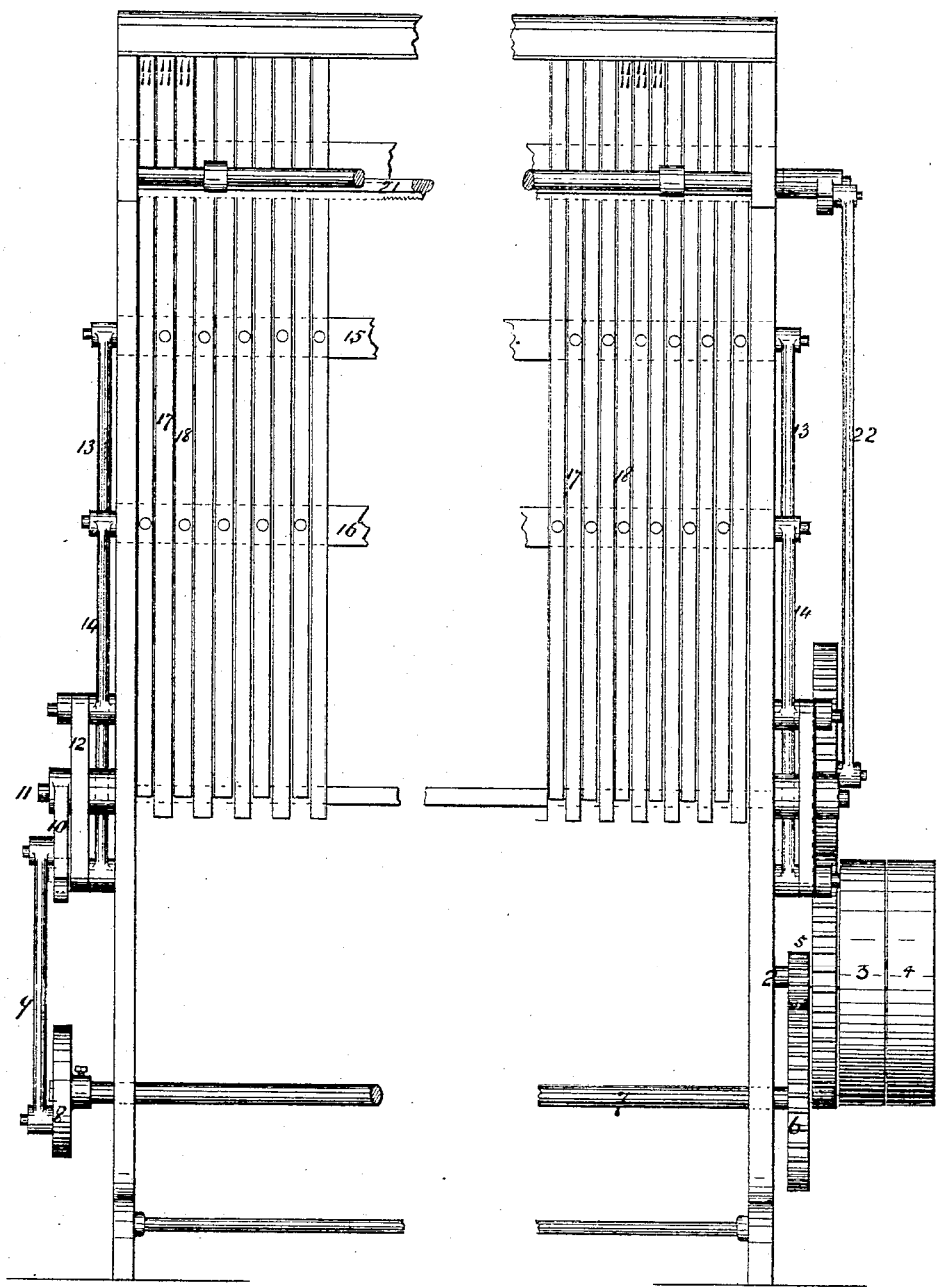

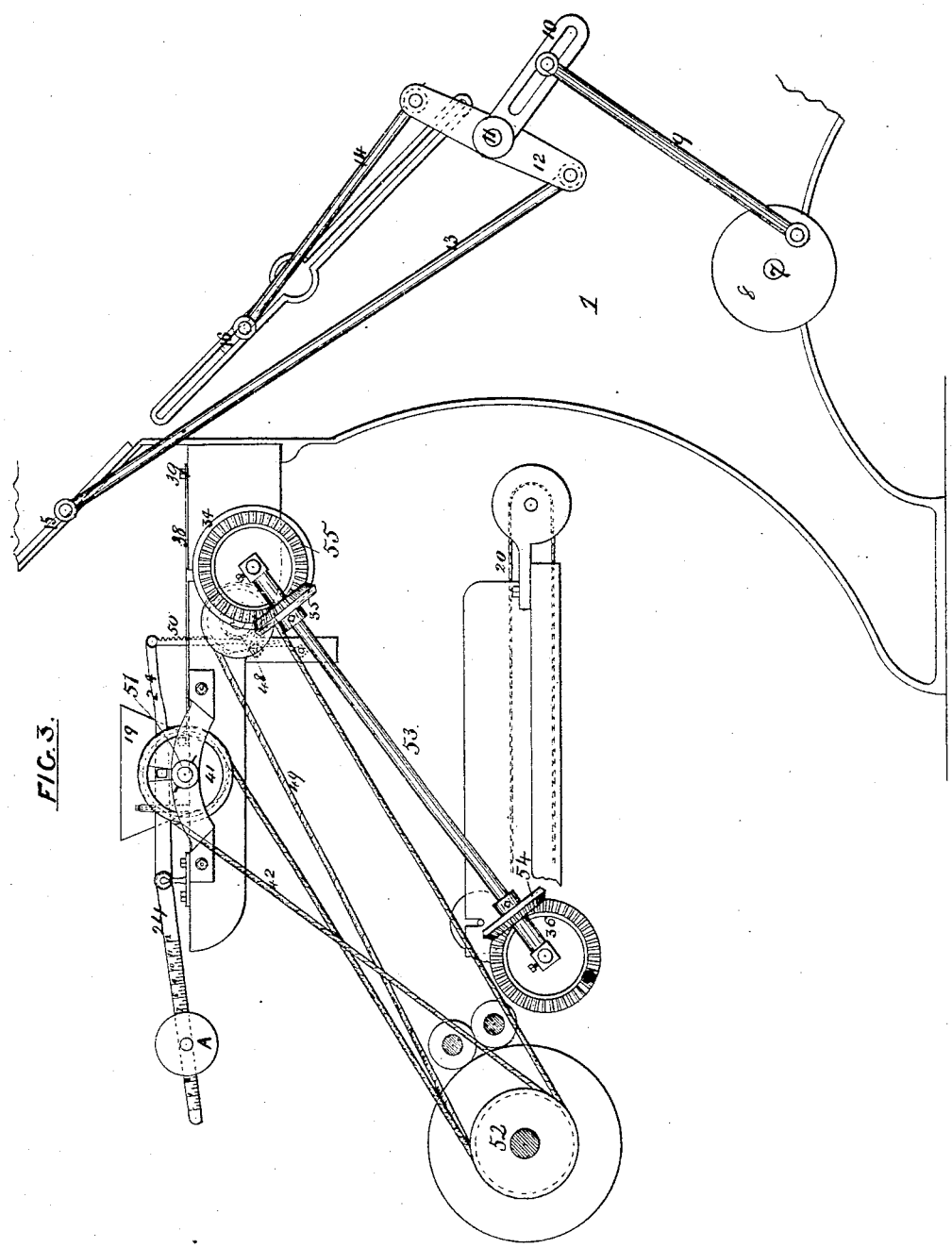

(No Model.)  4 Sheets—Sheet 4.
T. E. AINLEY.
MECHANISM FOR FEEDING CARDING MACHINES.
No. 288,686.  Patented Nov. 20, 1883.
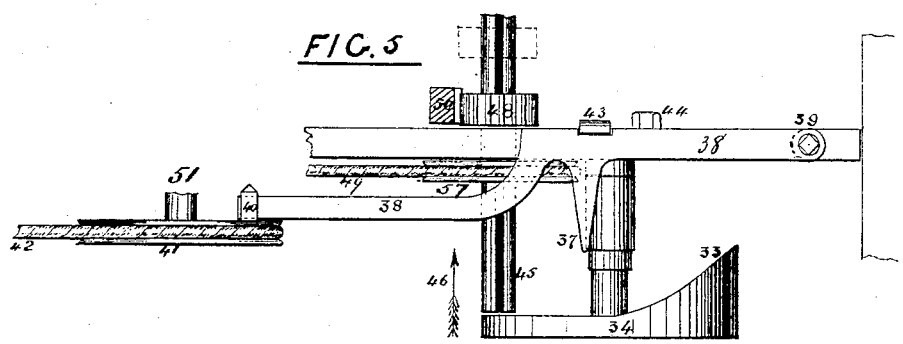
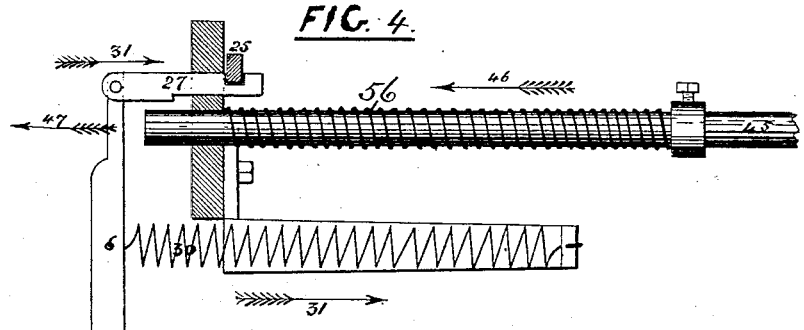
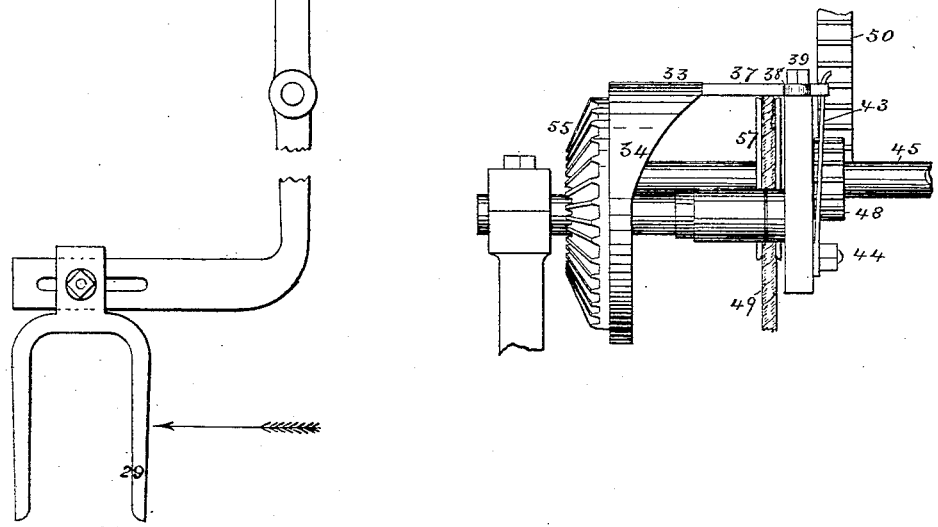
WITNESSES.
INVENTOR.
Thomas E. Ainley.

UNITED STATES PATENT OFFICE.

THOMAS E. AINLEY, OF GOLCAR, NEAR HUDDERSFIELD, COUNTY OF YORK, ENGLAND.

MECHANISM FOR FEEDING CARDING-MACHINES.

SPECIFICATION forming part of Letters Patent No. 288,686, dated November 20, 1883.

Application filed May 26, 1883. (No model.) Patented in England January 27, 1882, No. 429.

*To all whom it may concern:*

Be it known that I, THOMAS EDWARD AINLEY, a subject of the Queen of Great Britain, and a resident of Golcar, near Huddersfield, in the county of York, England, have invented certain Improvements in Mechanism for Feeding Wool and other Fibrous Substances to Carding-Machines in Regulated Quantities, of which the following is a specification.

My invention relates to a machine in which the substance is thrown into a hopper and is transferred therefrom by mechanism into a scale-pan, whence it is dumped automatically onto the creeper or feeding-apron of the machine. My machine comprises mechanism for transferring the wool or other substance from the receiving hopper or holder to the scale-pan of what I will call the "weighing device;" and the said weighing device or mechanism, all of which is automatic in its action, and the novel features of the invention, will be hereinafter specifically described, and set forth definitely in the claims.

In the drawings, which serve to illustrate my invention, Figure 1 is an elevation of one side of the hopper and a part of the weighing mechanism. Fig. 2 is a rear elevation of the hopper and its feeding mechanism, with back plate of hopper removed. Fig. 3 is an elevation of a part of the opposite side (from Fig. 1) of the hopper, and of the whole of that side of the weighing mechanism. Figs. 4, 5, and 6 are details of the mechanism detached, and on a larger scale than the principal figures.

The elements of the mechanism are designated by reference-numerals.

1 is the hopper, to contain the wool or other material, the general form of which is well represented in Figs. 1 and 2.

2 is the main driving-shaft, suitably provided with fast and loose pulleys 3 and 4. These are driven by a belt from some rotating part of a carding-machine—such, for instance, as the main driving-shaft. On the boss of the fast pulley 3 is keyed a toothed wheel, 5, which meshes with and drives a toothed wheel, 6, keyed on a horizontal shaft, 7, which extends through the hopper and bears on its opposite end (see Figs. 2 and 3) a crank-wheel, 8. A connecting-rod, 9, from this wheel imparts an oscillatory motion, through a crank, 10, to a rock-shaft, 11. Secured to this shaft is a double lever, 12, which, through the medium of connecting-rods 13 and 14, imparts a reciprocating motion to cross-bars 15 and 16, Fig. 2, to each of which is secured a series of bars, 17 and 18. Bars 17 alternate with bars 18, and bars 17 are attached to cross-bar 15. In the bars 17 and 18 are fixed teeth or spikes set at such an angle that they point upward toward the top of the inclined front of the hopper. The rock-shaft 11 extends across the hopper, and there is a lever, 12, and connecting-rods 13 and 14 at both sides of hopper, as will be seen. When shaft 7 is rotated, the sets of bars 17 and 18 are reciprocated, one set withdrawing as the other advances, and the wool is thus lifted and carried gradually to the overhanging front edge of the hopper, whence it falls into the scale-pan 19 of the weighing apparatus, to be afterward dumped from the same onto the creeper 20, which carries it forward to the feed-rollers of the carding-machine. It will sometimes happen that the bars 17 and 18 will carry up too much of the wool or other substance, and thus deliver it irregularly. To avoid this I employ a vibrating comb, 21, which serves to beat off the surplus material. This surplus then falls back to the bottom of the hopper again. This comb 21 receives its motion from a connecting-rod, 22, coupled to a wrist-pin, 60, placed eccentrically in a toothed wheel, 23, which is driven from the main shaft 2 by a gear-wheel thereon. It will be seen that by means of the toothed bars 17 and 18 and the vibrating comb 21 the wool or other substance will be lifted from the hopper in small flakes, and uniformly, and will thus feed and fill the scale-pan of the weighing apparatus with mechanical regularity. This insures an even feed to the carding-machine, which is so necessary to good spinning.

I will now describe the weighing apparatus and mechanism, which has been before referred to. My object in this is to overturn the scale-pan, which receives the wool from the apparatus last described, with regularity and at definite times, in order that the wool may be deposited on the creeper evenly. For this purpose I employ automatic mechanism operated from any convenient moving part of the carding mechanism—such, for instance, as the main driving-shaft. The scale-pan 19, before referred to, is connected by studs to the ends of a scale beam or lever, 24, which is forked where it embraces the pan, and is provided with a weight, A, to balance the loaded pan. When a predetermined amount of wool or other fiber has been deposited in the scale-pan, the weight thereof causes the same to descend. This descent of the pan shifts the belt which runs the mechanism in the hopper 1, and thus stops the feed to the pan until the latter tilts and empties. The mechanism for accomplishing this is best shown in Figs. 1 and 4, wherein 25 is a lever fulcrumed at 26, the left-hand end of which drops into a notch in a latch, 27, coupled to the upper end of a lever, 28, carrying a belt-shifting fork, 29, which straddles the driving-belt 32 in the usual way with such shifters. It will be seen that when the scale-pan descends the scale-beam 24 (see Fig. 1) will strike on the right-hand end of lever 25, and thus lift the opposite end of the latter out of the notch in latch 27. The spring 30 (see Fig. 4) will then be free to draw lever 28 to the right, in the direction of arrow 31, and shift the drawing-belt from the fast pulley 3 to the loose pulley 4. The movement of the mechanism in the hopper 1 will then cease.

I will now describe the mechanism for overturning the scale-pan 19, whereby its contents are dumped onto the endless lattice sheet or creeper 20. The scale-pan is mounted as before described, and is capable of being turned on its supporting lugs or studs, and it is overturned by the rotation of a pulley, 41. On shaft 51 is keyed the said pulley 41, which is driven by a belt, 42, from a pulley, 52, (see Fig. 3,) on a shaft in the carding-machine, which may be the main driving-shaft. In the face of pulley 41 is a peg, 40, which takes over or engages the end of a lever, 38, (see Fig. 5,) normally, whereby the pulley 41 is prevented from turning and inverting the scale-pan, except at stated times. The belt 42 is sufficiently loose to slip when the pulley 41 is locked fast, but is able to turn said pulley when unlocked.

I will now describe the unlocking mechanism, referring particularly to Figs. 3, 5, and 6. On the frame which supports the weighing mechanism the lever 38, before referred to, is fulcrumed at 39, and provided with a projection, 37. A cam, 34, mounted rotatively in the frame, has a projection, 33, which, as the cam rotates, contacts with projection 37 and presses the lever 38 to one side far enough for the end of same to free pin 40 in pulley 41 and allow the latter to revolve. This it does, and thus inverts the scale-pan and dumps its contents on the creeper. In the meantime the projection on the cam has passed that on lever 38, and the latter returns to the path of pin 40, whereby when pulley 41 has completed its revolution it must again stop. The lever 38 is returned by a spring, 43, which is secured to the frame by a screw, 44, as best shown in Fig. 6. The rotation of the cam 34 is effected by means of any suitable gearing properly timed. That shown in Fig. 3 comprises a bevel-wheel, 36, on the shaft of one of the rollers of the creeper 20, which drives a shaft, 53, through a bevel-wheel, 54. On the other end of shaft 53 is a bevel-wheel, 35, which drives a bevel-wheel, 55, on the same shaft with cam 34. The scale-pan has now dumped its contents and righted, and its weight being lessened the weight A has been enabled to lift it. The lever 25 being freed, its left-hand end rises out of the notch in latch 27. The continued rotation of cam 34 brings its projection 33 into contact with the end of a sliding shaft, 45, (see Figs. 4 and 5,) and the latter is pushed endwise in the direction of arrow 46. Its end impinges against lever 28 and pushes it over in the direction of arrow 47, thus shifting belt 32 over on the tight pulley and setting the mechanism in hopper 1 again in motion. In order to insure the pan 19 descending far enough and with sufficient force when filled with fiber, a pinion, 48, (see Fig. 5,) is mounted on shaft 45, which pinion is brought into engagement, when the pan begins its descent, with a pendent rack, 50, (see Fig. 3,) secured to the prolonged fork of the scale-beam 24. The shaft 45, and consequently pinion 48, has a continuous rotary motion imparted to it by a belt, 49, from pulley 52, or from a pulley on the same shaft. The movement of shaft 45 endwise disengages pinion 48 from rack 50 at the right moment to allow the weight A to again lift the scale-pan. The shaft 45 is returned to its normal position by a spring, 56. (Shown in Fig. 4.)

Thus it will be seen that the mechanism, as a whole, is automatic. The mechanism in the hopper feeds the fiber into the scale-pan until enough has been fed to overcome weight A. The pan then drops and shifts the belt so that the feeding mechanism stops. The pan is then inverted and its contents dumped onto the creeper. It is then righted, and, being freed from its load, rises and allows spring 30 to again shift the belt and set the hopper mechanism in motion again. These operations are repeated indefinitely. The pulley 57, Fig. 5, is splined on shaft 45, so that the latter may play through it. The mechanism comprising the pinion 48 and rack 50 is a precautionary device, and is not absolutely necessary to the working of the machine. It renders the operation more positive, however.

The mechanism connected with and including the tilting scale-pan I have, for convenience, called the "weighing mechanism;" but it will be understood that it is not intended to ascertain the weight of the wool, but only to deliver or feed it in regulated quantities.

I am aware that it has been proposed to employ in wool-washing machines a conveyer comprising sets of reciprocating toothed bars, and I do not therefore broadly claim this device; and I am also aware that rotating beaters have been proposed in connection with wool-feeding devices, and this I do not claim; but What I do claim is—

1. The combination of the scale-pan mounted on a tilting lever, substantially as shown, and adapted to descend, when filled, with the lever 25, latch 27, shifting-lever 28, provided with a fork, 29, and spring 30, all arranged to operate substantially as set forth.

2. The combination of the scale-pan mounted on a tilting lever, as shown, and capable of being inverted by rotation of the pulley 41, the said pulley 41 provided with pin 40, means, substantially as described, for imparting rotary motion to said pulley 41, cam 34, means, substantially as described, for imparting continuous rotation to said cam, the lever 38, and its spring 43, all arranged to operate substantially as set forth.

3. The combination of the scale-pan, the beam or lever 24 and its weight, the lever 25, the latch 27, the shifting-lever 28 and its fork, the spring 30, the sliding shaft 45, and means, substantially as described, for driving the same, the spring 56, and the cam 34 and its driving mechanism, all constructed and arranged to operate substantially as set forth.

4. The combination of the scale-pan, its beam or lever 24, and weight A, the rack 50, the pinion 48 on shaft 45, the said shaft 45 arranged to slide longitudinally, its spring 56, the cam 34, and mechanism, substantially as described, for imparting rotary motion to said cam, all arranged to operate substantially as set forth.

5. The combination, with the hopper 1 and the delivery mechanism contained therein, constructed substantially as described, of the tight and loose pulleys 3 and 4, the driving-belt 32, the shifting-lever 28 and its fork, the spring 30, latch 27, lever 25, scale-pan 19 and its beam and weight, all arranged to operate as described, whereby the descent of the loaded pan serves to shift the driving-belt and stop the delivery mechanism.

6. The combination of the scale-pan mounted on a tilting lever, as shown, the pulley 41, provided with a pin, 40, mechanism, substantially as described, for rotating said pulley and pan, the beam or lever 24 and its weight, the lever 38 and its spring 43, the cam 34, and the mechanism, substantially as described, for imparting continuous rotary motion to said cam, the sliding shaft 45 and its spring 56, the lever 25, latch 27, shifting-lever 28, provided with a fork, 29, and the spring 30, all arranged to operate substantially as set forth.

In witness whereof I have hereunto signed my name in the presence of two subscribing witnesses.

THOMAS E. AINLEY.

Witnesses:
 L. H. BARRON,
*Clerk to Messrs. Tasker & Crossley.*
 C. W. WHITMAN,
*United States Consular Agent at Huddersfield.*